Figure 1:
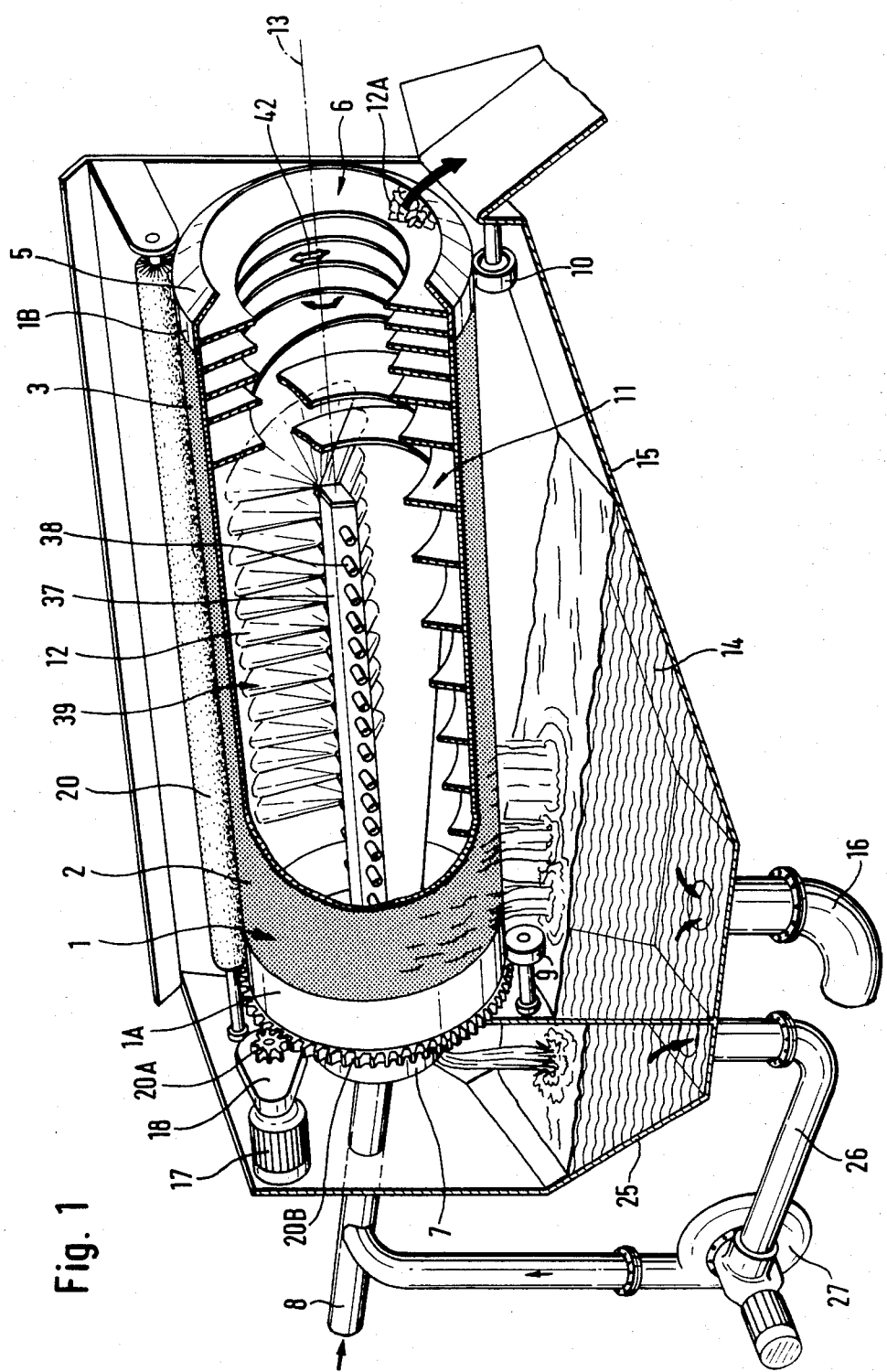

United States Patent [19]
Nord et al.

[11] Patent Number: 4,507,202
[45] Date of Patent: Mar. 26, 1985

[54] DEVICE FOR THE SEPARATION OF A LIQUID

[76] Inventors: Dan Nord, Bärs Lid 42, 446 00 Älvängen; Ingvar Johansson, Vårvindsgatan 49, 417 12 Göteborg, both of Sweden

[21] Appl. No.: 457,563

[22] Filed: Jan. 13, 1983

[30] Foreign Application Priority Data

Jan. 18, 1982 [CH] Switzerland ................. 8200232
Jan. 18, 1982 [CH] Switzerland ................. 8200233

[51] Int. Cl.³ .............................................. B01D 33/10
[52] U.S. Cl. ................................... 210/391; 210/197; 210/394; 210/403; 210/408; 210/456; 209/297
[58] Field of Search ............... 209/286, 284, 294, 293, 209/296, 297, 155, 452; 210/402, 403, 404, 405, 358, 357, 456, 457, 393, 397, 394, 408, 409, 196, 369, 372, 107, 213, 421, 377, 247, 279, 291, 305, 391; 34/135, 141, 142

[56] References Cited

U.S. PATENT DOCUMENTS

| | | | |
|---|---|---|---|
| 1,240,923 | 9/1917 | Bartley | 209/452 |
| 2,196,793 | 4/1940 | Hall | 210/403 |
| 2,652,588 | 9/1953 | Harris | 209/294 |
| 3,338,412 | 8/1967 | Fohlmann | 210/403 |
| 3,483,975 | 12/1969 | Yetter | 209/297 |
| 3,695,448 | 10/1972 | Johansson | 210/403 |
| 4,236,999 | 12/1980 | Burgess et al. | 209/294 |

FOREIGN PATENT DOCUMENTS

558083 4/1975 U.S.S.R. ................. 210/403

Primary Examiner—Arnold Turk
Assistant Examiner—John Donofrio

[57] ABSTRACT

The present invention relates to a device for the separation of a liquid from a sludge (12) or a liquid containing particles by means of a rotatable drum (1), inside which an inlet device for the supply of a sludge (12) or of a liquid containing particles debouches, the jacket (3) of said drum exhibiting ports (2) for making said separation of liquid possible, the drum (1) in its interior exhibiting a screw-type flange element (11) for the forward feed of the sludge, which flange (11) follows the rotating movement of the drum, said flange (11) extending from the inside of the jacket (3A) of the drum in direction towards the center (13) of the same.

The invention makes possible an effective supply of sludge (12) etc. to the interior of the drum and an effective separation of liquid from said sludge (12).

The inlet device (28) with a number of outlet openings (30, 31) extends unto and along said rotatable jacket (3) of the drum, and portion of the screw (11) for forward feed exhibits an increasing height of the flange blade (a, b, c etc.) along a substantial extension of the drum (1) as counted in the direction of forward feed, i.e. the distance occupied by the flange (11a, 11b, 11c etc.) in direction away from the jacket (3) of the drum towards the center of the drum (1) increases, whereby material accumulated between the flange sections can be received in an increasing quantity in the direction of the forward feed.

7 Claims, 7 Drawing Figures

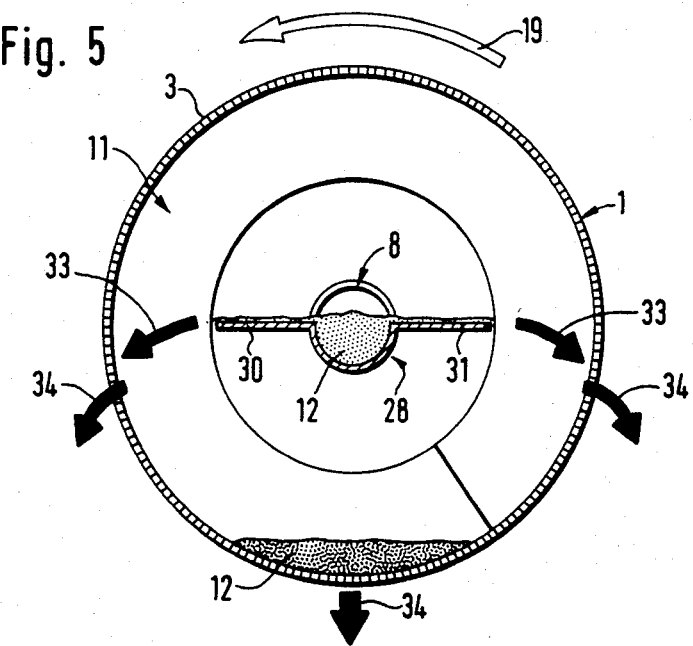
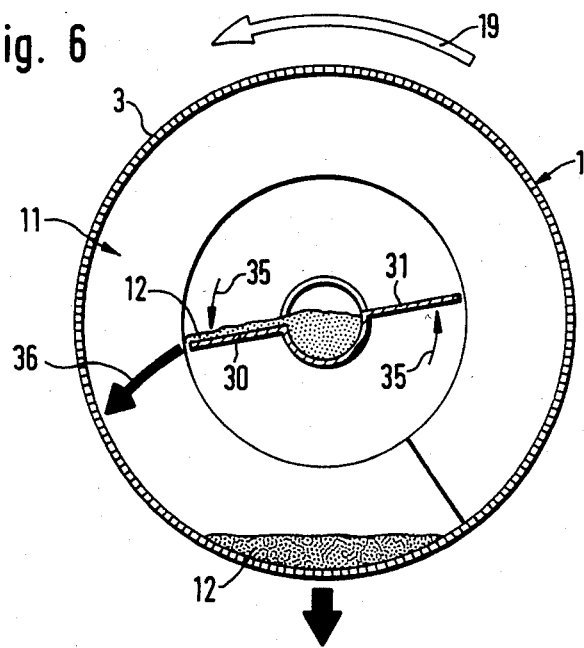

DEVICE FOR THE SEPARATION OF A LIQUID

The present invention relates to a device for the separation of a liquid from a sludge or from a liquid containing particles by means of a rotatable drum, inside which a device for the supply of sludge or liquid containing particles debouches, the jacket of said drum having ports for making the separation of liquid possible and in its interior having a screw-type flange element for the forward feed of the sludge, which flange element follows the rotation movement of the drum, the flange of said flange element extending from the inside of the jacket of the drum in a direction towards its center.

It is a principal object of the present invention in the first place to provide a device of the kind mentioned above, which makes possible an effective infeed of the sludge etc. into the interior of the drum and to an effective separation of the liquid from said sludge.

Said object is obtained by means of a device according to the present invention, which is substantially characterized by the inlet device being provided with a number of outlet ports extending close to and along said rotatable jacket of the drum, and by a portion of the screw for the forward feed exhibiting an increasing height of its flanges along a substantial extension of the drum as counted in the direction of forward feed, i.e. the distance occupied by the flange measured from the jacket of the drum in the direction towards the center of the drum increases, whereby material collected between the flange sections can be received in an increasing quantity in the direction of the forward feed.

Figure 2:
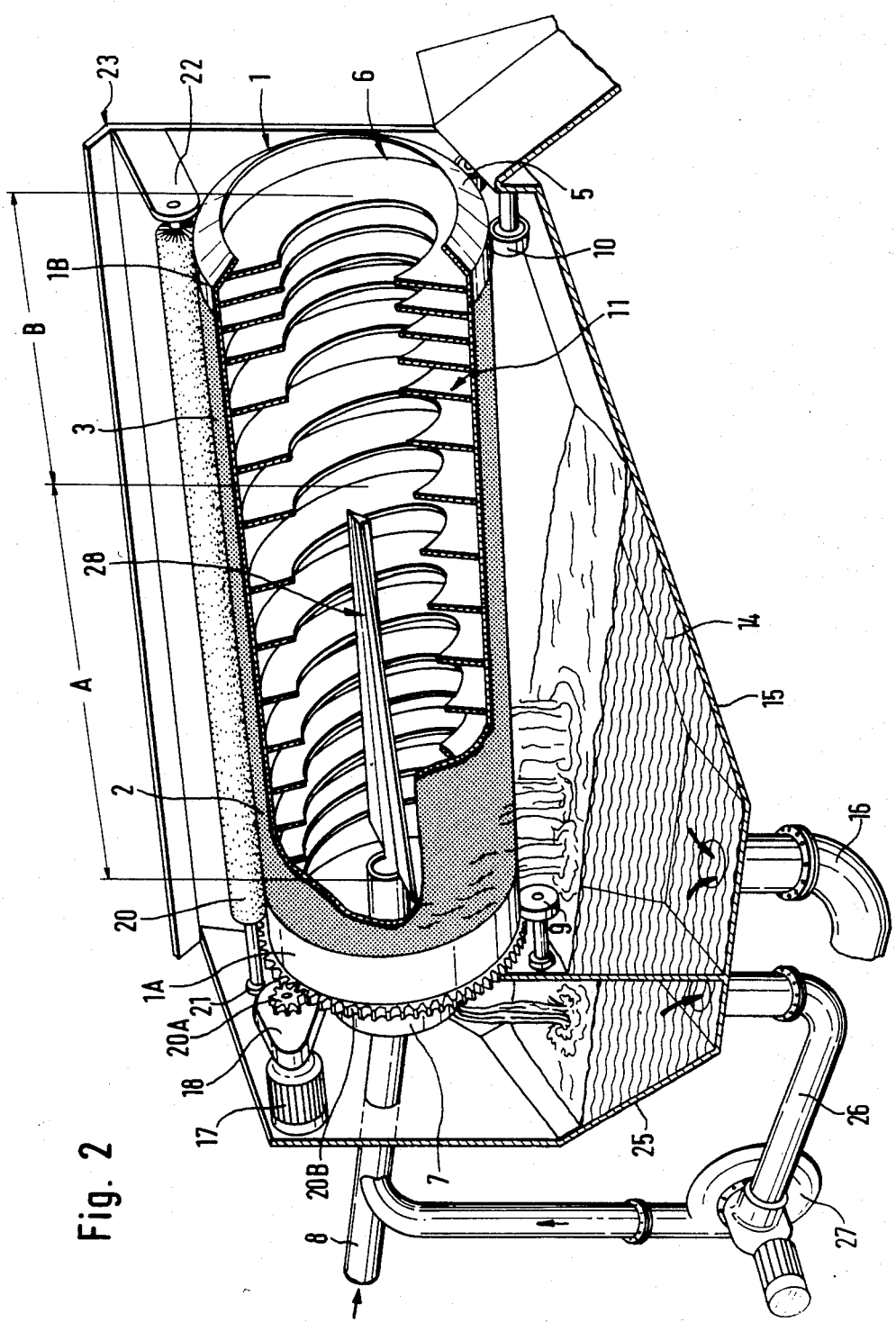
Figure 3:
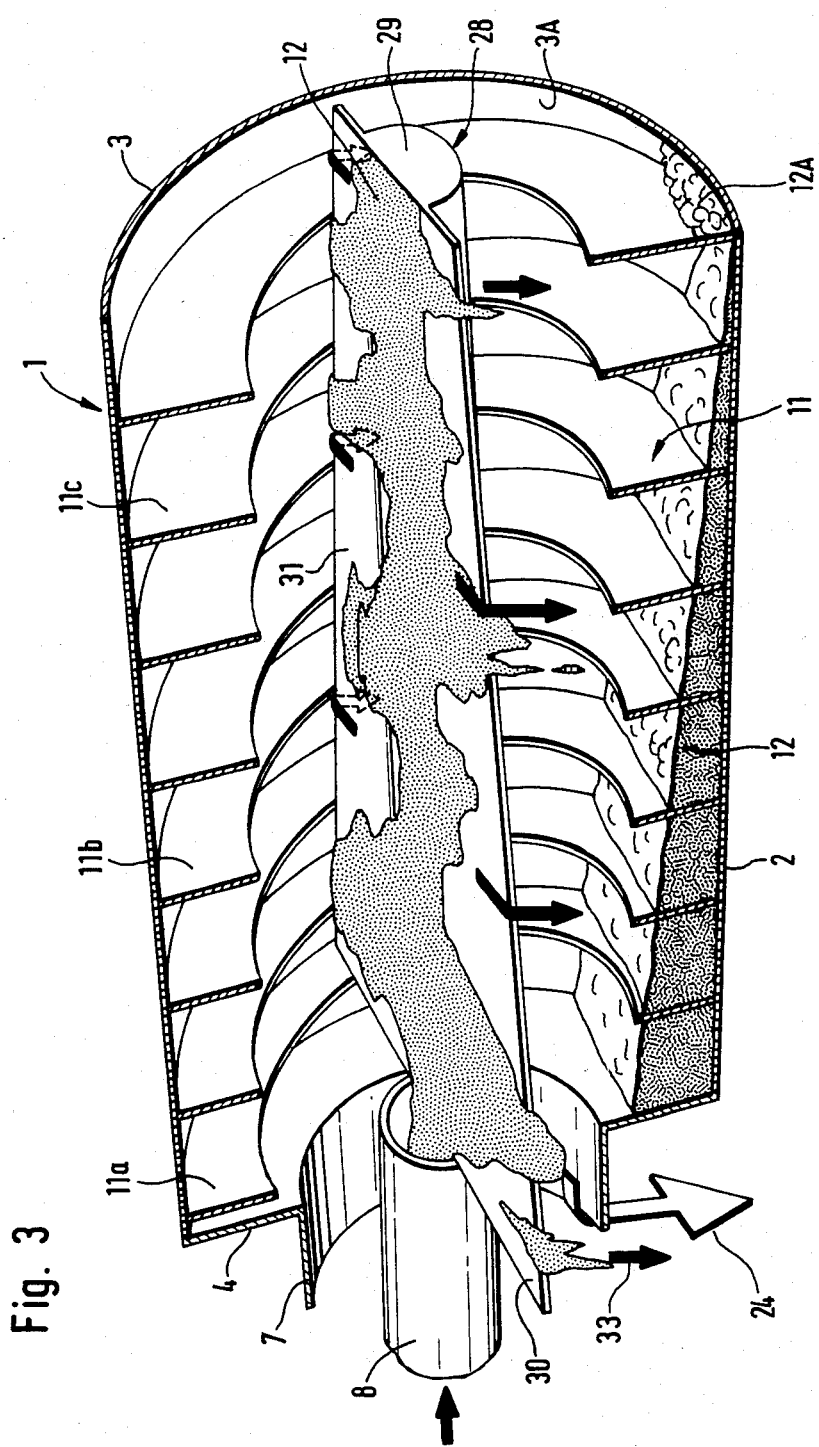
Figure 4:
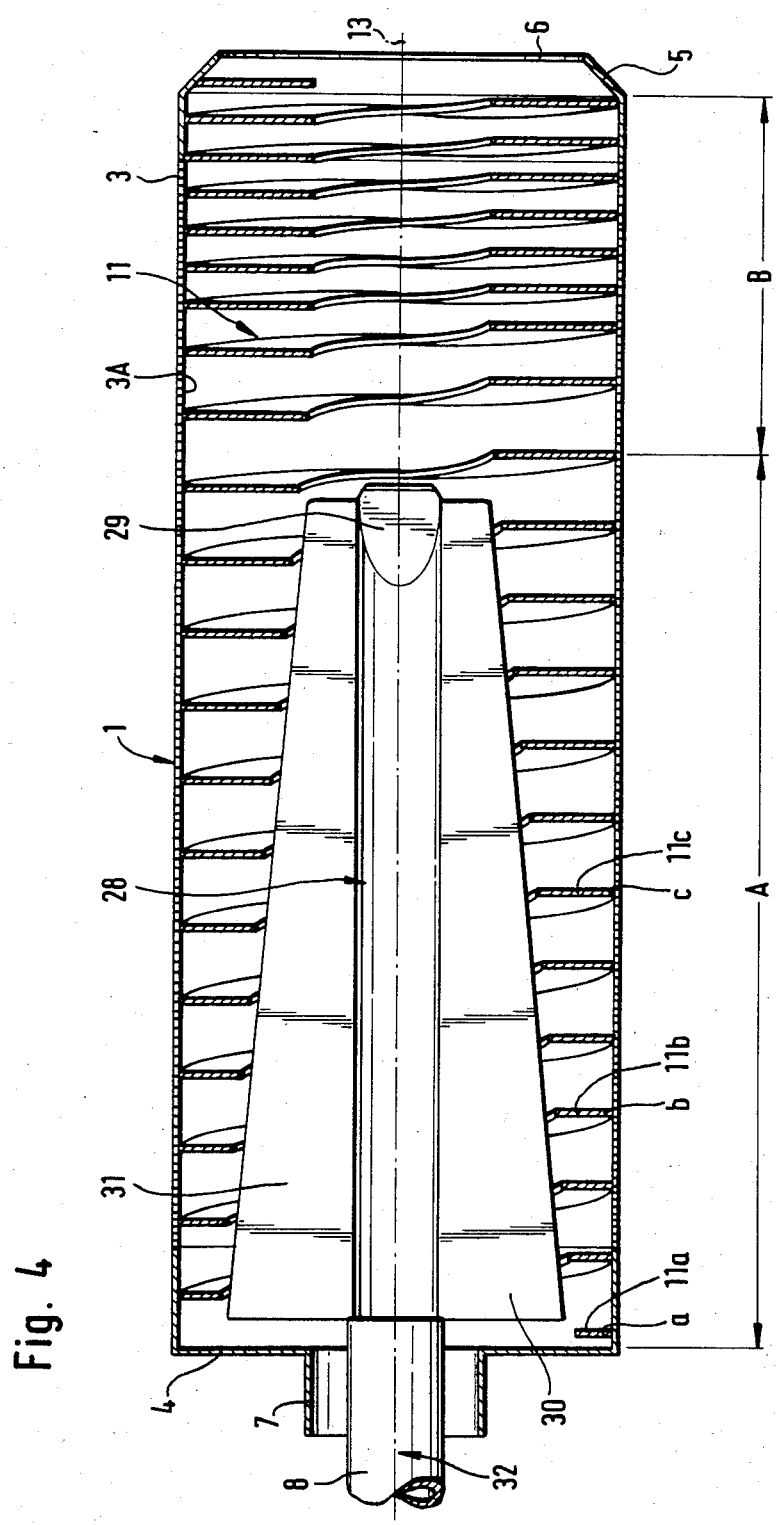
Figure 7:
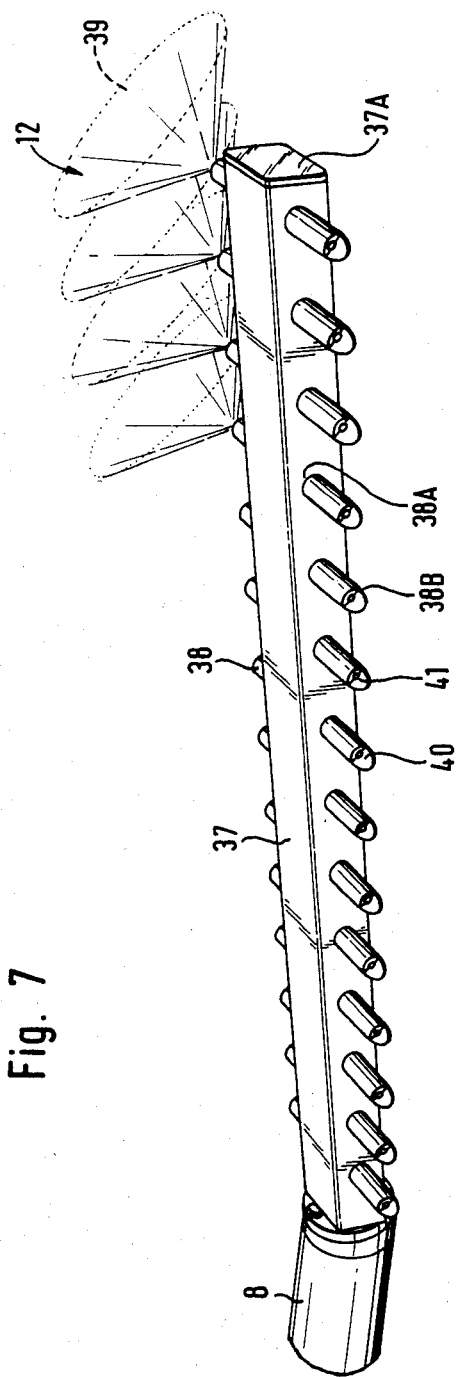

In the following a few examples of embodiments of the device according to the present invention are described, reference being made to the accompanying drawings, in which:

FIG. 1 shows a first example of an embodiment of a drum, where the invention has found an application, the device being shown in perspective view in partly sectional condition, FIG. 2 shows a second example of embodiment of a drum, where the invention has found an application, the device also here being illustrated in a perspective view in partly sectional condition, FIG. 3 is a part-sectional view of the device shown in FIG. 2, FIG. 4 is a schematical view of a longitudinal cross-section of the drum and the device shown in FIGS. 2 and 3, as seen from above, FIGS. 5 and 6 are cross-sectional views of the device shown in FIGS. 2-4 with the supply means occupying different positions, into which it has been rotated, and FIG. 7 is a partial view of such a supply means as has been applied to the drum and to the device shown in FIG. 1.

In the drawings a drum for separation of liquid according to the invention is indicated with the digit 1. The drum 1 has ports 2 by way of example in the form of perforations, slits or openings of a net-like form as known in connection with screen cloths, which extend through the jacket 3 of the drum. The drum 1 is at one of its ends partly closed by means of a preferably removable endwall 4, and at the other end of the drum the jacket 3 joins an endwall 5 having the form of the frustum of a cone. Said end wall 5 delimits an outlet opening 6 located in the narrow portion of the cone. A pipe socket 7, which is pointing backwards as seen in the direction of the forward feed, and which is coaxially arranged relative to the jacket 3 of the screening drum, joins the end wall 4.

A tube-shaped supply means 8 extends through the pipe socket 7 into the drum 1 and can be of conventional type or, as in the present example of embodiment, comprise such a device as is shown in FIGS. 1 and 7 and FIGS. 2–6 respectively.

The drum 1 for the separation of liquid is supported by a number of pairwise arranged supporting rollers 9 and 10 respectively, which are arranged to run each one along its runner 1A and 1B respectively located at each one of the ends of the drum 1. The rollers 9, 10 may suitably be vertically adjustable in order to make possible an adjustment of the drum 1, so that it can a acquire a desired inclination.

A feed device 11 is provided inside the drum 1 and is intended for the forward feed of the sludge 12 etc., which is supplied to the drum 1, the displacement taking place in the longitudinal direction of the drum 1. The feed device preferably has the form of a screw 11, which extends in radial direction from the inside 3A of the jacket 3 towards the center 13 of the drum.

As is for example evident from FIGS. 3 and 4, the screw 11 has an increasing height of its flange blade as counted in the direction of feed along a substantial portion A of the drum 1, i.e. the distance a, b, c etc. of the blade sections 11a, 11b, 11c etc. in the direction from the jacket 3 of the drum towards the center 13 of the drum 1 increases. The increase may suitably be chosen in such a manner that it substantially will be constant from the beginning to the end of said portion A, but the possibility also exists to arrange a stepwise reduction of the height of the flange blade. The length of said portion A is suitably ⅔ of the operative length of the drum. The pitch of the screw 11 can also be varied in direction from the intake 7 of the drum to its outlet 6 in any desired manner.

After said portion A exhibiting an increasing height of the flange blade the screw 11 terminates with a portion B with a preferably constant height of the flange blade. Said constant height of the flange blade is suitably as great as the largest height of the flange blade of the portion A. The pitch of the portion B is suitably chosen to be smaller than the one of the portion A, as is evident from FIGS. 1, 2 and 4, so that by this arrangement the portion B will serve the purpose of a prolonged dewatering step for material, which is fed forward by means of the screw shaped feed device 11.

The function of the drum 1 with the screw flange 11 belonging thereto described above and illustrated in the drawings is as follows: The sludge 12, which is fed into the interior of the drum 1 by means of the feed device 8, is effectively separated from liquid 14, when it reaches contact with the inner wall 3 of the jacket of the drum. The liquid 14 then passes through the perforations 2 of the jacket wall 3 and is collected in a receptacle 15, which is located underneath the drum 1, from which the liquid 14 is fed out via a discharge pipe 16. The drum 1 is arranged in such a way that it can be rotated by means of for example an electric driving motor 17, which via a change-gear mechanism 18 by means of a drive gear 19 cooperates with a gear ring 20, which is provided along the circumference of the drum at one of the end walls 4 of the same and drives the drum 1 in the same direction as the pitch of the screw shaped flange device 11 extends, as is hinted with the arrow 19 in FIGS. 5 and 6. The collected sludge 12 is transported in the intermediate spaces between juxtapositioned flange sections thanks to the pitch of the flange device 11 in the direction towards the outlet opening 6 of the drum, when said drum 1 is rotated, as has been said above, and the sludge 12 is then effectively separated from the liquid 14. Thanks to the gradually increasing height of the flange blade element 11 in the direction towards the outlet opening 6 it is made possible to receive an increasing quantity of sludge 12 etc. between two juxtapositioned flange blade sections, the farther they are located as counted from the inlet opening 7.

The portion B of the flange blade element 11 for the separation of liquid further dewaters the substantially already dewatered material, which by means of the screw shaped flange blade element 11 has been fed forwards, before the dewatered cleaned sludge 12A is fed out through the opening 6 in order to be collected in a tank, a cleaning press or the like not shown in the drawings.

Any material, that possibly may have accumulated in the ports 2, is in conventional manner removed by means of a brush 20, which is pressed against the jacket 3 of the drum, and which has comparatively stiff bristles, and a rinsing pipe directed towards the outer surface of the jacket of the drum serving the purpose to supply liquid. The brush 20 is at its respective free ends pivoted on a bearing device 21 and 22 respectively, and is suitably supported by a casing 23 of the drum 1 functioning as a splash protecting device. The drive of the brush 20 takes place either by a separate driving means or by the brush lying against the jacket 3 of the drum being rotated together with the drum 1. The cleaning operation is performed by bristles penetrating into the perforations 2 of the jacket of the drum, which perforations for example can be circular or slit shaped, and effectively cleaning said ports from said undesired accumulations of for example impurities.

If nevertheless the perforations 2 of the jacket of the drum should be clogged and because thereof the quantity of liquid in the interior of the drum be increased, the surplus liquid will flow in direction of the arrow 24 in FIG. 3 over the spillway formed by the pipe socket 7 located at a lower level than the bottom edge of the outlet opening 6 of the drum at the opposite end. The surplus liquid flows into a collection tank 25 and is from there via a discharge duct 26 discharged. This liquid can for example by means of a pumping device 27 be returned to the dewatering device via the inlet duct 8. A number of suitable sensor devices can be provided in connection with the spillway 7 in order to adjust the quantity of sludge 12, that is supplied to the device.

Under normal operating conditions of the device a good separation of liquid 14 from the sludge 12 etc. fed to the device is obtained, and the dewatered cleaned sludge 12A, which is fed out through the opening 6, will then be very dry.

The feeding device 8 shown in FIGS. 2–6 debouches in an inlet device 28 of an upwards open chute-like design and in the direction of feed exhibiting an increasing volume, said inlet device extending into and along the drum 1 for a distance equal to approximately ⅔ of the length of the drum, i.e. substantially along the entire screw flange portion A. The end of said inlet device 28 is preferably formed by an end wall 29, which slants in direction away from the bottom portion of the chute 28 towards the outlet opening 6 of the drum, and which preferably has a greater vertical height than the lateral edges of the chute, and along said lateral edges a projecting flange 30 and 31 respectively extends each one in its direction away from the chute 28. Said flanges 30, 31 are located close to the inner wall of the jacket 3 of the drum and extend along the flange blade element 11. On account of said flange blade element having increasing height of the flange blade as counted in the direction of outlet feed, both the flanges 30, 31 preferably have a greater sideways extention at the one end of the chute 28, which is facing away from the direction of the outlet feed, and the flanges 30, 31 are suitably designed with a successively diminishing width as seen in the direction of feed, as is clearly evident from FIGS. 3 and 4. As is evident from FIG. 4 the inlet device 28 is pivoted on the shaft 32, which in the illstrated example is congruent with the central shaft 13 of the drum.

Sludge 12 etc., which is supplied to the chute 28 through the pipe 8, passes along said flow flanges 30, 31 in the direction indicated with arrows 33, i.e. in sideways direction towards the wall of the jacket 3 of the drum. The dewatering of the sludge 12 is effectively brought about by the main portion of the sludge being brought to the lateral surface of the jacket 3 of the drum 1, where there are no accumulations of liquid. About ⅓ of the liquid from the supplied sludge flows through each one of the points of through flow indicated with the digit 34 and an arrow respectively, when the feeding device 28 is adjusted with uniformly adjusted flow flanges 30, 31, as is shown in FIG. 5.

When the feeding 28 is rotated into the position illustrated in FIG. 6, in the direction of the arrows 35, the sludge 12 will substantially be brought only to one lateral wall of the surface of the jacket 3 in the direction of the arrow 36. By supplying the sludge 12 in substantially the same direction, in which the drum is rotated, as is shown in FIG. 6, a more efficient degree of cleaning will be obtained for the liquid 14 flowing through the perforations 2, than is the case, if the sludge 12 is substantially supplied against the direction of rotation of the drum. However, when the supply takes place in the counter direction, a quicker dewatering effect is obtained, which sometimes may be desired, by way of example in case there are several cleaning steps, but particles not desired such as fibres etc. may the also flow out together with the liquid 14 through the perforations 2.

The feeding device used in the embodiment according to FIG. 1 and which is shown separately in FIG. 7, as distinguished from the previous arrangements does not function, when the supplied liquid falls freely and contains the undesired particles, which one wants to separate from the liquid, in which case the sludge etc. supplied must be subjected to a pressure by means of for example a pump, before it is let in through the pipe 8 into the drum 1. Said pipe 8 debouches in an additional pipe 37, which by way of example has a polygonic cross-sectional form, and which at its free end has an end lid 37A. Along said supply duct 37 extending inside and along the interior of the drum it is made possible to mount spray nozzles 38 interspaced in a desired arrangement. The nozzles 38 can suitably be arranged in rows on opposite sides of said pipe 37, so that they spray the sludge 12 etc. in different directions, as seen from the pipe 37, onto diametrically opposing sides of the jacket 3 of the drum. The nozzles 38 with a suitable spray pattern are then suitably chosen according to what is required, and in the example shown the nozzles 38 spray the sludge 12 in the form of configurations similar to elliptical fields 39, along which the sludge 12 is spread in a substantially uniform manner. The nozzles 38, which at one of their ends have a threaded fastening portion 38A, are screwed into for example openings of the pipe 37 and are adjusted in a desired position, so that the field of spray 39 lands on the desired area. Nozzles 38 with varying fields 39 of spray can also be used, and the nozzles 38 with an elliptical spray formation can be rotated in such a manner that the longitudinal axis of the respective spray field has an inclination towards and/or in the direction of feed of the screw flange element 11 and/or cross-wise to the same. More than one spray pipe 37 can also extend into and along the drum 1, and the distribution of the nozzles 38 can then differ from the embodiment shown.

The uniform spraying of the sludge 12 along an elliptically shaped spray field on the surface of the jacket 3 of the drum is in the example shown performed by means of nozzles 38, each of which at its outlet end 38B has a preferably V-shaped recess 40 extending across the longitudinal extension of the nozzle, and an outlet channel 41 with a preferably rounded bottom extending from the threaded end 38A of the nozzle to said recess 40.

The device illustrated in FIG. 1 is especially useful for an additional cleaning of particle contaminated liquids, which are obtained in an earlier dewatering operation, and when it is of great importance that the liquid is effectively cleaned from particles not desired. Said inlet pipe 37 can also be pivoted in such a manner that it can be adjusted in any desired pivoting position along the directions of rotation indicated with the arrows 42 in FIG. 1 in order to it make possible to obtain a desired spread of the sludge 12 in a desired area along the inner surface of the jacket 3A of the drum.

The invention is not limited to the embodiments described above and illustrated in the drawings, but can be varied within the scope of the following claims.

We claim:

1. An apparatus for separating a liquid from a sludge or from a liquid containing particles, comprising: a rotatable drum having a jacket with openings for discharge of liquid, an inlet device at one end of the drum for the supply of sludge or liquid containing particles into said drum, the inlet device being formed by a duct having an open chute-like structure provided with an end wall blocking liquid flow and flanges extending along both sides of said chute-like structure for flow of liquid from said chute over said flanges, said chute-like structure and flanges extending a substantial distance into said drum, a screw element in said drum for the forward feed of sludge or liquid containing particles, said screw element having a portion extending along at least the whole longitudinal extension of the duct inside the drum and essentially perpendicular to the inside of the jacket, the screw element having flange blade sections of increasing height counted in the feed direction for the sludge or the liquid containing particles, measured from the jacket of the drum in a direction towards the center of the drum whereby an increasing quantity of material collected between the flange blade sections can be conveyed in the direction of the forward feed to means for discharging the collected medium, and whereby the sludge or the liquid containing particles which flow in the duct can pass freely along said flanges for supply at an angle against the jacket of the drum at a distance from the bottom of the drum.

2. An apparatus according to claim 1, wherein said screw element portion extends over approximately two-thirds of the length of the drum.

3. An apparatus according to claim 1, wherein the duct is pivotable on a shaft extending in the longitudinal direction of the drum, the pivotal arrangement being such as to permit an angular setting of said duct relative to the drum and crosswise to the longitudinal direction of the drum.

4. An apparatus according to claim 1, wherein said flanges extend at least unto said screw element flange blade sections.

5. An apparatus according to claim 1, wherein said end wall is inclined in the direction away from the bottom of the duct.

6. An apparatus according to claim 1, wherein the distance beteween two juxtapositioned flange blade sections substantially is uniform along said screw portion.

7. An apparatus according to claim 1, wherein said screw element has an additional screw portion in an area after said first-mentioned screw portion, said additional screw portion functioning as a prolonged dewatering stage for material which has been fed forward by means of said screw element in a direction away from said first screw portion, said flange sections of said additional screw portion having a substantially uniform height, said height being at least equal to the greatest height of the flange sections of said first-mentioned screw portion.

* * * * *